United States Patent
Powell, Jr. et al.

(10) Patent No.: US 12,132,327 B2
(45) Date of Patent: Oct. 29, 2024

(54) ADAPTING DEVICE FOR A WIRELESS POWER TRANSMITTER AND RECEIVER AND METHOD OF USING SAME

(71) Applicant: Aptiv Technologies AG, Schaffhausen (CH)

(72) Inventors: George Powell, Jr., Cortland, OH (US); James Cook, Poland, OH (US)

(73) Assignee: APTIV TECHNOLOGIES AG, Schaffhausen (CH)

( * ) Notice: Subject to any disclaimer, the term of this patent is extended or adjusted under 35 U.S.C. 154(b) by 17 days.

(21) Appl. No.: 17/732,431

(22) Filed: Apr. 28, 2022

(65) Prior Publication Data

US 2022/0352753 A1  Nov. 3, 2022

Related U.S. Application Data

(60) Provisional application No. 63/181,940, filed on Apr. 29, 2021.

(51) Int. Cl.
*H02J 50/00* (2016.01)
*H02J 7/00* (2006.01)
*H02J 50/10* (2016.01)

(52) U.S. Cl.
CPC .......... *H02J 50/005* (2020.01); *H02J 7/0042* (2013.01); *H02J 50/10* (2016.02)

(58) Field of Classification Search
None
See application file for complete search history.

(56) References Cited

U.S. PATENT DOCUMENTS 10,484,522 B1 * 11/2019 McHatet .............. H04B 1/3888
2021/0099031 A1 * 4/2021 Jol ........................ H02J 7/02

\* cited by examiner

*Primary Examiner* — Daniel Kessie
(74) *Attorney, Agent, or Firm* — Billion & Armitage

(57) ABSTRACT

An adapting device interfaces a wireless power transmitter having a first array of magnets arranged around a source coil in the wireless power transmitter with a wireless power receiver lacking a corresponding array of magnets arranged around a receiver coil in the wireless power receiver. The adapting device includes a planar dielectric substrate and a second array of magnets embedded in the substrate, having a polarization opposite to the first array of magnets, and configured to contain a magnetic flux formed by the first and second array of magnets to the wireless power transmitter and the adapting device.

14 Claims, 2 Drawing Sheets

ADAPTING DEVICE FOR A WIRELESS POWER TRANSMITTER AND RECEIVER AND METHOD OF USING SAME

CROSS REFERENCE TO RELATED APPLICATION(S)

This patent application claims the benefit of U.S. Provisional Application No. 63/181,940, filed Apr. 29, 2021 which is incorporated by reference in its entirety.

TECHNICAL FIELD OF THE INVENTION

The invention generally relates to a wireless power transmission system for charging batteries in a consumer electronics device, particularly to an adapting device located intermediate a wireless power transmitter having an array of magnets surrounding its source coil and a wireless power receiver lacking a corresponding array of magnets surrounding its receiver coil.

BACKGROUND

Wireless power transmission systems, such as the MagSafe® wireless power transmission system developed by Apple, Inc. of Cupertino, California, uses an array of magnets in a wireless power transmitter of a charging device that interface with a corresponding array of magnets in a wireless power receiver housed within a consumer electronics device. The magnets in the transmitter and the receiver have compatible polarizations that cause the receiver to be properly aligned with the transmitter and provide physical retention of the receiver to the transmitter. This provides optimal alignment between a receiver coil in the receiver and a source coil in the transmitter, thereby allowing a maximum power transmission between the transmitter and the receiver.

The polarization of the array of magnets in the transmitter, which are designed to facilitate the magnetic pairing with a corresponding array of magnets in the receiver, may cause magnetic coupling issues between the source coil in the transmitter and a receiver coil when an alternative receiver that lacks the corresponding array of magnets is used with the transmitter. Without a corresponding array of magnets in the alternative receiver, the magnetic flux from the array of magnets in the transmitter may saturate receiver coil shielding in the alternative receiver, thereby causing significantly reduced charging performance of the wireless power transmission system.

BRIEF SUMMARY OF THE INVENTION

According to one aspect, an adapting device interfaces a wireless power transmitter having a first array of magnets arranged around a source coil in the wireless power transmitter with a wireless power receiver lacking a corresponding array of magnets arranged around a receiver coil in the wireless power receiver. The adapting device includes a planar dielectric substrate and a second array of magnets embedded in the substrate, having a polarization opposite to the proximal surface of the first array of magnets, and configured to contain magnetic flux formed by the first and second array of magnets to the wireless power transmitter and the adapting device.

According to another aspect, a method of interfacing a wireless power transmitter having a first array of magnets arranged around a source coil in the wireless power transmitter with a wireless power receiver lacking a corresponding array of magnets arranged around a receiver coil in the wireless power transmitter includes providing the wireless power transmitter and providing the wireless power receiver. The method further includes arranging an adapting device having a planar dielectric substrate and a second array of magnets embedded in the substrate intermediate the wireless power transmitter and the wireless power receiver.

According to another aspect, a wireless power charging device includes a wireless power transmitter and an adapting device. The wireless power transmitter includes a source coil and a first plurality of magnets arranged adjacent to or partially surrounding the source coil. The adapting device interfaces with the wireless power transmitter and includes a planar dielectric substrate and a second plurality of magnets embedded in the substrate, having a polarization opposite to the first plurality of magnets, and configured to contain magnetic flux formed by the first and second plurality of magnets to the wireless power transmitter and the adapting device.

BRIEF DESCRIPTION OF THE DRAWINGS

The present invention will now be described, by way of example with reference to the accompanying drawing, in which.

DETAILED DESCRIPTION

The problem of an array of magnets surrounding a source coil in a wireless power transmitter saturating a receiver coil magnetic shield in a wireless power receiver lacking a corresponding array of magnets surrounding its receiver coil and thereby reducing wireless charging performance may be solved by an adapting device, e.g., in the form of a case that fits onto a consumer electronics device containing the wireless power receiver that includes a planar dielectric substrate and a second array of magnets embedded in the substrate. Alternatively, the adapting device may be in the form of a pad that is placed atop the receiver. The second array of magnets has two magnetic poles and are arranged in a mirror image of the top surface of the first array of magnets and have a magnetic polarization that is opposite that of the first array of magnets. The second array of magnets is configured to contain magnetic flux formed by the first and second array of magnets to the wireless power transmitter and the adapting device, thereby preventing the magnetic flux from saturating the receiver coil magnetic shield.

Figure 1:
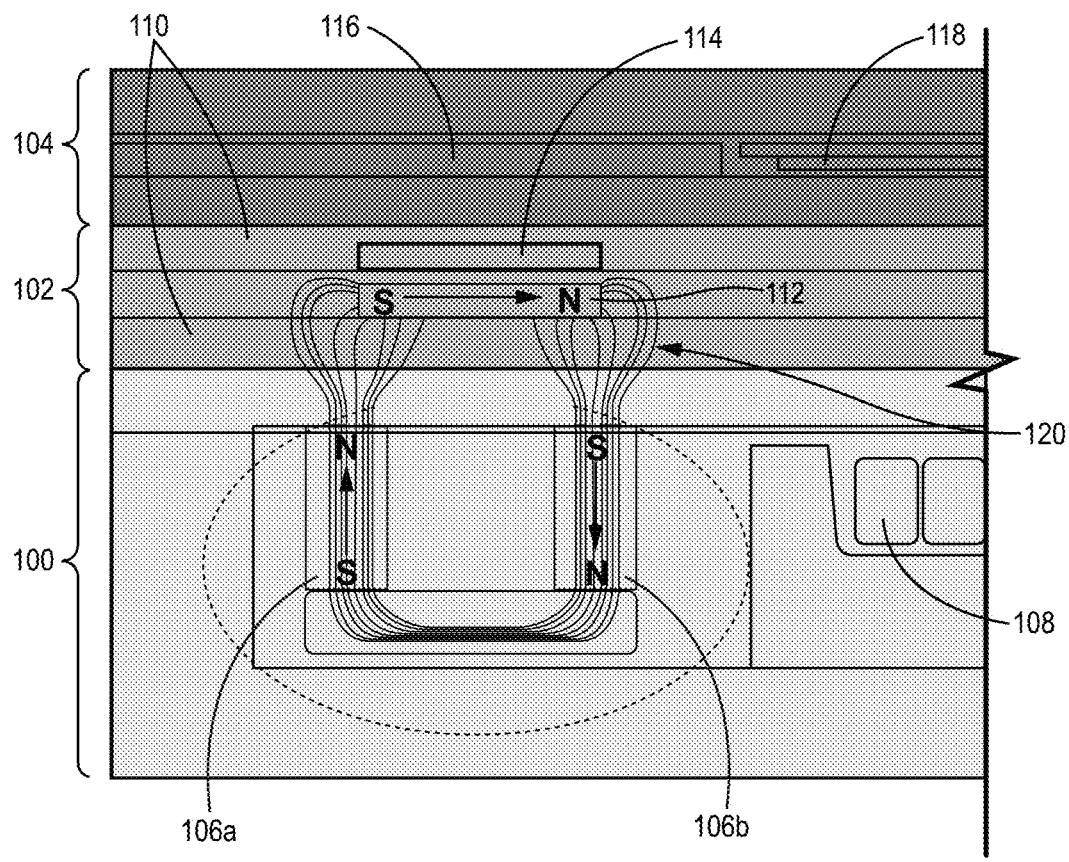
FIG. 1 is a schematic cross section view of a wireless power transmitter having an array of magnets, a wireless power receiver lacking a corresponding array of magnets, and an adapting device between the transmitter and receiver in accordance with some embodiments.

FIG. 1 is a schematic cross section view illustrating a wireless power transmitter or transmitter assembly 100, an adapting device 102, and a wireless power receiver or receiver assembly 104. The transmitter assembly 100 includes a first magnet array including magnets 106a, 106b (referred to collectively as the first magnet array 106) and a source coil 108. The adapting device 102 includes a substrate 110, a second array of magnets 112 (only one magnet is visible in the view shown in FIG. 1), and a magnetic shield 114. The receiver 104 includes a receiver coil shield 116 and a receiver coil 118. The cross-sectional view shown in FIG. 1 illustrates a left portion of the transmitter assembly 100, the adapting device 102, and the receiver assembly 104. In some embodiments, the first magnet array 106 extends annularly or semi-annularly around the source coil 108. Likewise, the second magnet array 112 and magnetic shield 114 may extend annularly or semi-annularly around the receiver coil 118 (as shown in more detail in FIG. 2).

In some embodiments, power is wirelessly transmitted from the transmitter assembly 100 to the receiver assembly 104. In particular, power is wirelessly transmitted from the source coil 108 to the receiver coil 118. The first magnet array 106 creates magnetic flux 120 that interacts with a magnet array (not shown) associated with some receiver assemblies to ensure proper alignment between the transmitter assembly 100 and the corresponding receiver assembly. In the example shown in FIG. 1, the receiver assembly 104 does not include a corresponding magnet array. To prevent magnetic flux 120 generated by the first magnet array 106 from interfering with the magnetic field/flux utilized to transmit power between the source coil 108 and the receiver coil 118, the adapting device 102 is placed between the transmitter assembly 100 and the receiver assembly 104. For example, the adapting device 102 may be placed on top of the transmitter assembly 100 and the receiver assembly 104 is placed on top of the adapting device 102. In other embodiments, the adapting device 102 may be affixed to the receiver assembly 104, wherein the combination of the adapting device 102 and the receiver assembly 104 is placed on the transmitter assembly 100.

As illustrated in FIG. 1, in order to not saturate the receiver coil shield 116 in the receiver assembly 104 with the magnetic flux 120 from the first array of magnets 106 surrounding the source coil 108, a second array of magnets 112 is embedded in the substrate 110 of the adapting device 102 that is located intermediate, i.e., between, the transmitter assembly 100 and receiver assembly 104 during the wireless charging process. In some embodiments, the second magnet array 112 are utilized to direct or channel the magnetic flux generated by the first array of magnets 106 to desired locations (i.e., channel the magnetic flux within the adapting device 102 and prevent the magnetic flux generated by the first magnet array 106 from interfering with the receiver coil 118). In some embodiments, the poles associated with the second magnet array 112 are configured to have an opposite polarity relative to the proximate magnet located in the first magnet array 106. For example, in the embodiment shown in FIG. 1, the inner radius magnet 106b included as part of the first magnet array 106 has a magnetic south pole (S) proximate to the magnetic north pole (N) of the magnet included as part of the second magnet array 112. Likewise, the outer radius magnet 106a included as part of the first magnet array 106 has a magnetic north pole (N) proximate to the magnetic south pole (S) of the magnet included as part of the second magnet array 112. In each case, the second magnet array 112 is arranged such that the pole most proximate to the first magnet array 106 is opposite in polarity. This configuration ensures that magnetic flux generated by the first magnet array 106 is channeled into the second magnet array 112. In the embodiment shown in FIG. 1, the magnet included as part of the second array of magnets 112 is oriented horizontally, with one pole located on an inner radius of the magnet and the opposite pole located on the outer radius of the magnet (also shown in FIG. 2). In other embodiments, other geometries may be employed based on the orientation and geometry of the first magnet array 106. Each magnet in the second array of magnets 112 has a polarization opposite the corresponding magnet in the first array of magnets 106 to channel the magnetic flux 120 back to the first array of magnets 106, thereby inhibiting the magnetic flux 120 from flowing through the receiver coil shield 116.

In some embodiments, adapting device 102 may include an annular ring-shaped magnetic shield 114 embedded in the substrate 110 in a location proximate the second array of magnets 112 and arranged coaxially with the second array of magnets 112. The ring-shaped magnetic shield 114 is positioned in the substrate 110 such that the ring-shaped magnetic shield 114 is interposed between the second array of magnets 112 and the wireless power receiver 104 when the receiver is placed on or near the transmitter assembly 100. In some embodiments, the ring-shaped magnetic shield 114 has a low electrical conductivity to improve charging performance. The adapting device 102 may also include an orienting magnet (not shown) embedded in the substrate 110 that can interface with a corresponding orienting magnet in the transmitter assembly 100 to help align the receiver assembly 104 on the transmitter assembly 100.

In some embodiments, the adapting device 102 includes a planar dielectric substrate or substrates 110 for interfacing with the transmitter assembly 100 on a first side and with the receiver assembly 104 on a second side opposite the first side. In addition, the planar dielectric substrates 110 house the second array of magnets 112 and the magnetic shield 114.

In some embodiments, the transmitter assembly 100 may contain a magnetic sensor (not shown) incorporated into the transmitter assembly 100 to detect the presence of the second array of magnets 112. If the sensor detects that the second array of magnets 112 or that the receiver assembly 104 contains an array of magnets that correspond to the first array of magnets 106, the transmitter assembly 100 may be configured to operate at a higher power charging value, e.g., 15 W. Otherwise, charging may be limited to a lower power value, e.g., 5 W.

Figure 2:
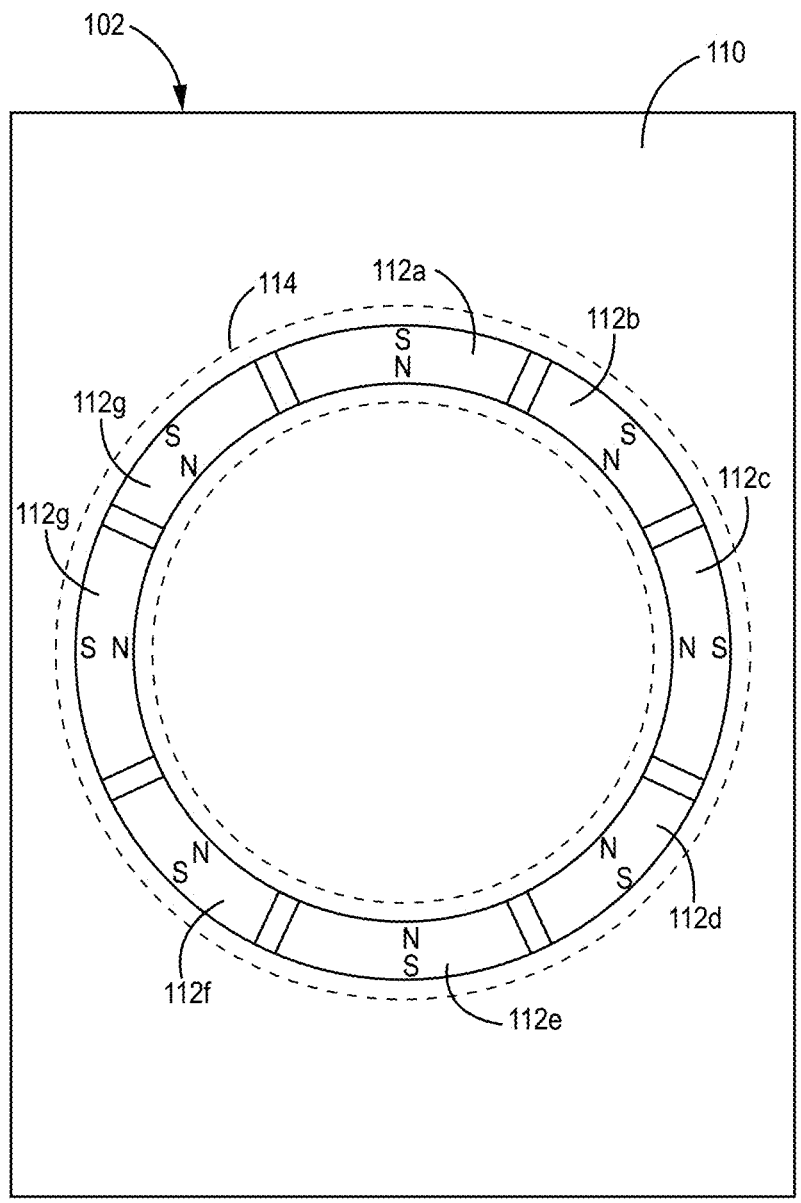
FIG. 2 is a schematic top view of the adapting device according to some embodiments.

FIG. 2 is a schematic top view of the adapting device 102 according to some embodiments. The schematic view shown in FIG. 2 illustrates an annular second array of magnets 112 comprised of a plurality of individual magnets 112a-112h. Each of the plurality of magnets 112a-112h include a magnetic north pole and a magnetic south pole. In the embodiment shown in FIG. 2, the magnetic north of each of the plurality of magnets 112a-112h is located on the inner circumference of the annular second array of magnets 112 and the magnetic south is located on the outer circumference of the annular second array of magnets 112. In other embodiments the polarization of the magnets 112a-112h (collectively, "magnets 112") may be reversed based on the polarization of the first array of magnets 106. In the embodiment shown in FIG. 2, the second array of magnets 112 forms an annular ring. In other embodiments, the second array of magnets 112 may form a partial ring. In some embodiments, arrangement of the second array of magnets 112 is selected to mirror the arrangement of the first array of magnets 106.

In addition, in some embodiment the adapting device 102 includes a magnetic shield 114 provided above the second array of magnets 112. In the embodiment shown in FIG. 2, the magnetic shield 114 is annular in shape to accommodate the annular shape of the second array of magnets 112. In other embodiments, the magnetic shield 114 has a geometry configured to correspond with the geometry of the second array of magnets 112 (e.g., annular, semi-annular, etc.).

In some embodiments, the adapting device 102 differs from a MagSafe® compatible accessory that is designed to be used with an iPhone® or other MagSafe® compatible device. The array of magnets inside the MagSafe® compatible accessory have four poles and are polarized to allow the magnetic flux from the first array of magnets 106 in the transmitter assembly 100 to pass through to the receiver assembly 104. In contrast, the second array of magnets 112 in the adapting device 102 have a polarity that is two pole and opposite to the array of magnets inside the MagSafe® compatible accessory to channel the magnetic flux 120 from the first array of magnets 106 into a closed loop that does not reach the receiver assembly 104.

The advantage of this design is that it channels the magnetic flux from the first array of magnets 106 into a closed loop back, preventing the magnetic flux from saturating the receiver coil shield 116 in the receiver assembly 104. This will significantly improve wireless charging performance of receivers without an array of magnets located opposite the first array of magnets 106. With the inclusion of a sensor in the transmitter, the transmitter would be capable of charging consumer electronics devices at a higher power, e.g., 15 W regardless of whether the receiver contains a corresponding array of magnets.

Applicability of the adapting device 102 is not exclusive to use with wireless power transmitters 100 having an array of magnets 106 but may also be used to improve charging performance with any wireless power receiver which does not contain enough high permeability, low conductivity shielding material (e.g., ferrite, nanocrystalline) to fully shield the conductive parts of the receiver device (i.e., friendly metals; e.g., battery, metal brackets, PCB) from the magnetic flux that is generated by the wireless power transmitter 100. The adapting device 102 is particularly useful when the wireless power transmitter 100 utilizes source coils 108 covering a larger area than the receiver coils 118 in the wireless power receiver 104.

While this invention has been described in terms of the preferred embodiments thereof, it is not intended to be so limited, but rather only to the extent set forth in the claims that follow. For example, the above-described embodiments (and/or aspects thereof) may be used in combination with each other. In addition, many modifications may be made to configure a particular situation or material to the teachings of the invention without departing from its scope. Dimensions, types of materials, orientations of the various components, and the number and positions of the various components described herein are intended to define parameters of certain embodiments and are by no means limiting and are merely prototypical embodiments.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any particular order, order of operations, direction or orientation unless stated otherwise.

We claim:

1. An adapting device configured to interface a wireless power transmitter having a first array of magnets arranged around a source coil in the wireless power transmitter with a wireless power receiver lacking a corresponding array of magnets arranged around a receiver coil in the wireless power receiver, the adapting device comprising:
    a planar dielectric substrate;
    a second array of magnets embedded in the substrate, having a polarization opposite to the first array of magnets, and configured to contain a magnetic flux formed by the first and second array of magnets to the wireless power transmitter and the adapting device and to inhibit magnetic saturation of receiver coil magnetic shielding arranged around the receiver coil by the first array of magnets; and
    adapting device magnetic shielding embedded in the substrate interposed between the second array of magnets and the wireless power receiver when the receiver is placed on or near the wireless power transmitter.

2. The adapting device according to claim 1, wherein the substrate is configured to position the second array of magnets generally coaxial with the receiver coil.

3. The adapting device according to claim 2, wherein the second array of magnets is arranged in an arc shaped configuration.

4. The adapting device according to claim 1, wherein the substrate is configured to be located intermediate the wireless power transmitter and the wireless power receiver.

5. A method, comprising:
providing a wireless power transmitter that includes a first array of magnets; and
arranging an adapting device having a planar dielectric substrate between the wireless transmitter and a wireless power receiver that does not include a corresponding second array of magnets, wherein the adapting device includes a second array of magnets embedded in the substrate configured to inhibit magnetic saturation of receiver coil magnetic shielding arranged around the receiver coil in the wireless power receiver by the first array of magnets, and adapting device magnetic shielding embedded in the substrate between the second array of magnets and the wireless power receiver.

6. The method according to claim 5, wherein the second array of magnets has a polarization opposite to the first array of magnets and is configured to contain a magnetic flux formed by the first and second array of magnets to the wireless power transmitter and the adapting device.

7. The method according to claim 5, wherein the second array of magnets is arranged generally coaxial with the receiver coil.

8. The method according to claim 7, wherein the second array of magnets is arranged in an arc shaped configuration.

9. An adapting device, comprising:
a planar dielectric substrate with a first side configured to interface with a wireless power transmitter having a first array of magnets arranged around a source coil in the wireless power transmitter, and a second side configured to interface with a wireless power receiver lacking a corresponding array of magnets arranged around a receiver coil in the wireless power receiver;
a second array of magnets embedded in the substrate, having a polarization opposite to the first array of magnets, and configured to contain a magnetic flux formed by the first and second array of magnets to the wireless power transmitter and the adapting device and to inhibit magnetic saturation of receiver coil magnetic shielding arranged around the receiver coil by the first array of magnets; and
adapting device magnetic shielding embedded in the substrate interposed between the second array of magnets and the second side.

10. The adapting device of claim 9, wherein the magnetic shield has a geometry configured to correspond with the geometry of the second array of magnets.

11. The adapting device of claim 9, wherein the second side interfaces with a wireless power receiver that includes a receiver coil for receiving wireless power from the source coil but lacks a corresponding array of magnets arranged around the receiver coil in the wireless power receiver.

12. The adapting device of claim 9, further comprising:
an orienting magnet embedded in the substrate that can interface with a corresponding orienting magnet in the wireless power transmitter to help align the wireless power receiver with the wireless power transmitter.

13. The adapting device of claim 9, wherein the wireless power transmitter includes a sensor that detects whether the wireless power receiver is lacking a corresponding array of magnets arranged around the receiver coil in the wireless power receiver.

14. The adapting device of claim 13, wherein the sensor enables the wireless power transmitter to charge the wireless power receiver at higher power when the wireless power receiver is lacking a corresponding array of magnets arranged around the receiver coil in the wireless power receiver.

* * * * *